US007215238B2

(12) United States Patent
Buck et al.

(10) Patent No.: US 7,215,238 B2
(45) Date of Patent: May 8, 2007

(54) COMBINED GARAGE DOOR AND KEYLESS ENTRY FOB

(75) Inventors: M. Scott Buck, Commerce Township, MI (US); Thomas H Tu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 243 days.

(21) Appl. No.: 10/850,762

(22) Filed: May 21, 2004

(65) Prior Publication Data

US 2005/0258934 A1 Nov. 24, 2005

(51) Int. Cl.
*H04Q 9/00* (2006.01)
*H04Q 5/22* (2006.01)
*G08C 19/00* (2006.01)

(52) U.S. Cl. .................. 340/5.23; 340/5.72; 340/5.28; 340/5.71; 340/10.1; 340/825.72; 340/825.69; 318/16

(58) Field of Classification Search ............... 340/5.23, 340/5.72, 5.28, 5.71, 10.1, 825.72, 825.69; 318/16
See application file for complete search history.

(56) References Cited

U.S. PATENT DOCUMENTS 5,940,007 A * 8/1999 Brinkmeyer et al. ... 340/825.69
6,127,740 A * 10/2000 Roddy et al. .............. 307/10.1
6,377,173 B1 * 4/2002 Desai .................... 340/426.36
6,525,645 B2 * 2/2003 King et al. .................. 340/5.7
6,667,684 B1 * 12/2003 Waggamon et al. ....... 340/5.71
6,980,080 B2 * 12/2005 Christensen et al. ......... 340/3.5

* cited by examiner

*Primary Examiner*—Jeffery Hofsass
*Assistant Examiner*—Scott Au
(74) *Attorney, Agent, or Firm*—Timothy J. Marsh

(57) ABSTRACT

Methods and apparatus are provided for a combined vehicle keyless entry and garage door (GD) opener fob. The fob comprises a receiver, transmitter, processor, memory, user activated function switches, and preferably a display. In a GD function learn mode, the fob memorizes the signal parameters of a GD activate signal received directly from a nearby GD opener. In the normal GD operate mode, the fob transmits a replica of the GD activate signal using the learned signal parameters stored in the memory. The optional display preferably tells the user that the learn mode is active, prompts the user to operate the nearby GD opener during the learn mode, indicates whether the learn operation was successful or not and shows when the fob has returned to normal (non-learn mode) operation. The GD modes of the fob are entirely self-contained and do not depend upon the vehicle electronics system.

20 Claims, 3 Drawing Sheets

COMBINED GARAGE DOOR AND KEYLESS ENTRY FOB

TECHNICAL FIELD

The present invention generally relates to remote control devices, and more particularly to providing a garage door (GD) opener function in a vehicle keyless entry fob.

BACKGROUND

It is well known in the art to provide vehicles with keyless entry systems. Typically there is small, pocket sized, portable, wireless remote control device called a 'fob' that is electronically (e.g., RF or IR) coupled to the vehicle control system such that, activation of various buttons on the fob will cause the vehicle doors, windows, trunk, etc., to lock, unlock, open or close, and so forth. Other functions may also be included, as for example, engine start, engine stop, alarm, etc. It is also known to provide pocket-sized portable, wireless remote control devices to activate electrically operated garage doors and the like. In the past it has been most common for the user to have two fobs, one for vehicle entry and another for garage door activation. Both types of fobs work on substantially the same general principle, that is, the user presses a button on the fob thereby causing it to transmit a coded RF signal of a predetermined frequency to a receiver mounted in the vehicle or adjacent to the garage door activation motor. A receiver tuned to the RF signal emitted by the fob detects the coded information carried by the RF signal, verifies that it matches a predetermined code stored in the fob memory or hard-wired in the fob or equivalent, and carries out the intended command, e.g., open door, close door, etc. The RF signal is coded for security purposes so that the garage door or vehicle entry system will only respond to a fob that transmits the correct signal code or format. For convenience of explanation, it is assumed that the fob operated by transmitting and receiving RF signals, but this is not intended to be limiting and any form of wireless signally can be used. Optical and ultrasonic signaling are well known alternatives. Accordingly, as used here the term RF is intended to include these and other alternative wireless signally means.

It is also known to incorporate the garage door opening function into an automobile. For example, U.S. Pat. No. 4,731,605 to Nixon describes an arrangement where a garage door activation transmitter provided by the garage door manufacturer is mounted in the engine compartment of an auto, powered from the auto's electrical system and a remote control switch connected thereto mounted in the passenger compartment where it can be conveniently activated by the driver. It is also known to combine both the vehicle keyless entry functions and the garage door activation functions into a single pocket-sized portable fob. Such an arrangement is described in U.S. Pat. No. 6,377,173 B1 to Desai. Desai uses a scanning receiver built into the vehicle's on-board electronic systems to detect and analyze the garage door (GD) opener's transmission frequency and code, that is, its signaling parameters. The onboard vehicle electronic system then sends these signaling parameters to the portable fob where they are memorized and thereafter used to provide the garage door (GD) activation function in the same fob as for the vehicle keyless entry function. Thus, there is taught a two-step training or learning process in which the garage door (GD) opener frequency and code are first received and analyzed by the vehicle electronic system and then parameters describing the GD activation signal (rather than the actual GD opener activation signal itself) are sent to the fob. Once that is accomplished, the combined fob can activate the garage door (GD) in the same way as the original GD opener itself. While this arrangement is useful it suffers from a number of disadvantages, as for example, it cannot be used with vehicles whose on-board electronics system lacks a frequency scanning receiver able to capture and analyze the GD remote control's transmission frequency and code (collectively the GD activate signal parameters). Further, the two-step learning process adds complexity and cost that are undesirable. Still further, it can be more difficult to provide a substantially universal fob so far as the GD function is concerned, since the capabilities of the vehicle electronic system essential for capture and learning of the GD opener signal parameters may be different for different vehicles.

Accordingly, it is desirable to provide a combined keyless entry and garage door (GD) fob without depending on the vehicle electronic system for GD remote control operating parameter capture and analysis. In addition, it is desirable that the GD remote control operating parameter capture and analysis function be entirely contained in the fob for portability during the capture and learning process. This portability especially facilitates capture and learning in more sophisticated GD opener systems that use rolling codes and/or that require signal exchanges with a transceiver mounted on or near the door lift motor, for example, where GD activation requires 2-way communication between the lift motor controller and the associated fob. Furthermore, other desirable features and characteristics of the present invention will become apparent from the subsequent detailed description and the appended claims, taken in conjunction with the accompanying drawings and the foregoing technical field and background.

BRIEF SUMMARY

A portable fob is provided having a combined vehicle keyless entry function and garage door (GD) opener function. The apparatus comprises a receiver for receiving GD activate signals directly from an ordinary GD opener during a GD function learn mode, a processor coupled to the receiver for analyzing the GD activate signals received by the receiver directly from the ordinary GD opener to obtain the GD activate signal parameters, a memory coupled to the processor for storing the GD activate signal parameters determined by the processor, a transmitter coupled to the processor for broadcasting in response to a user command a replica of the GD activate signal based on the parameters stored in the memory, and one or more user activated function switches for first placing the fob in the GD function learn mode and thereafter for causing the fob to transmit the replica of the GD activate signal. An optional display is coupled to the processor for, among other things, indicating when the fob is in the learn mode, for prompting the user to operate the nearby GD opener for learning purposes, and to indicate whether learning was successful or not.

A method is provided for operating a self-contained combined vehicle keyless entry and garage door (GD) opener fob. The method comprises, in a learning mode, receiving a GD activate signal directly from a nearby GD opener, analyzing the received GD activate signal in the fob to determine its essential parameters sufficient to permit replication of the GD activate signal, storing the essential parameters in memory in the fob thereby completing the learning mode, and thereafter using the stored parameters on user command to cause the fob to transmit a replica of the GD activate signal. In the preferred embodiment, the method further comprises prior to the receiving step, prompting the user to activate the nearby GD opener and thereafter indicating whether the learning operation was successful or not.

The foregoing summary of the preferred embodiments has been provided only by way of introduction. Nothing in this section should be taken as a limitation on the following claims, which define the scope of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
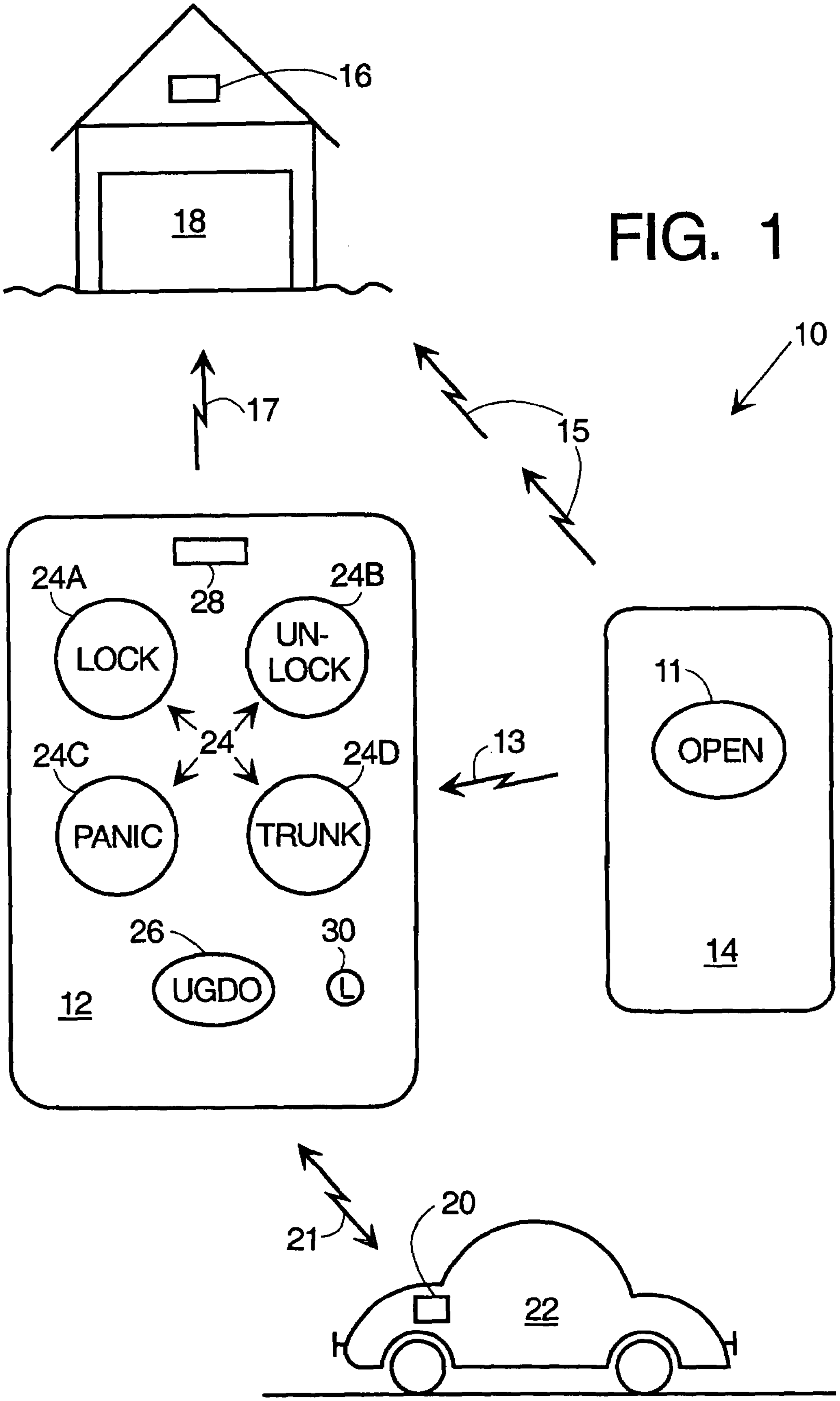
FIG. 1 is a simplified schematic block diagram of a combined remote vehicle keyless entry and garage door control fob system according to the present invention.

FIG. 1 is a simplified schematic block diagram of combined remote vehicle keyless entry and garage door control fob system 10 according to the present invention. System 10 comprises combined fob 12 that receives coded RF signals 13 from garage door (GD) opener remote control 14 during the fob's learning mode. GD opener remote 14 conventionally sends coded RF signals 15 to GD opener receiver and door actuation motor 16 that acts to open and close garage door (GD) 18 in response to signals 15. Combined fob 12 interacts with vehicle electronic system 20 in vehicle 22 by means of RF signal 21 for the vehicle keyless entry control functions and with garage door actuator system 16 by means of RF signal 17 for opening and closing garage door 18. From the point of view of garage door opener receiver and actuation motor 16, signals 15 and 17 are substantially similar and have the same effect.

Figure 2:
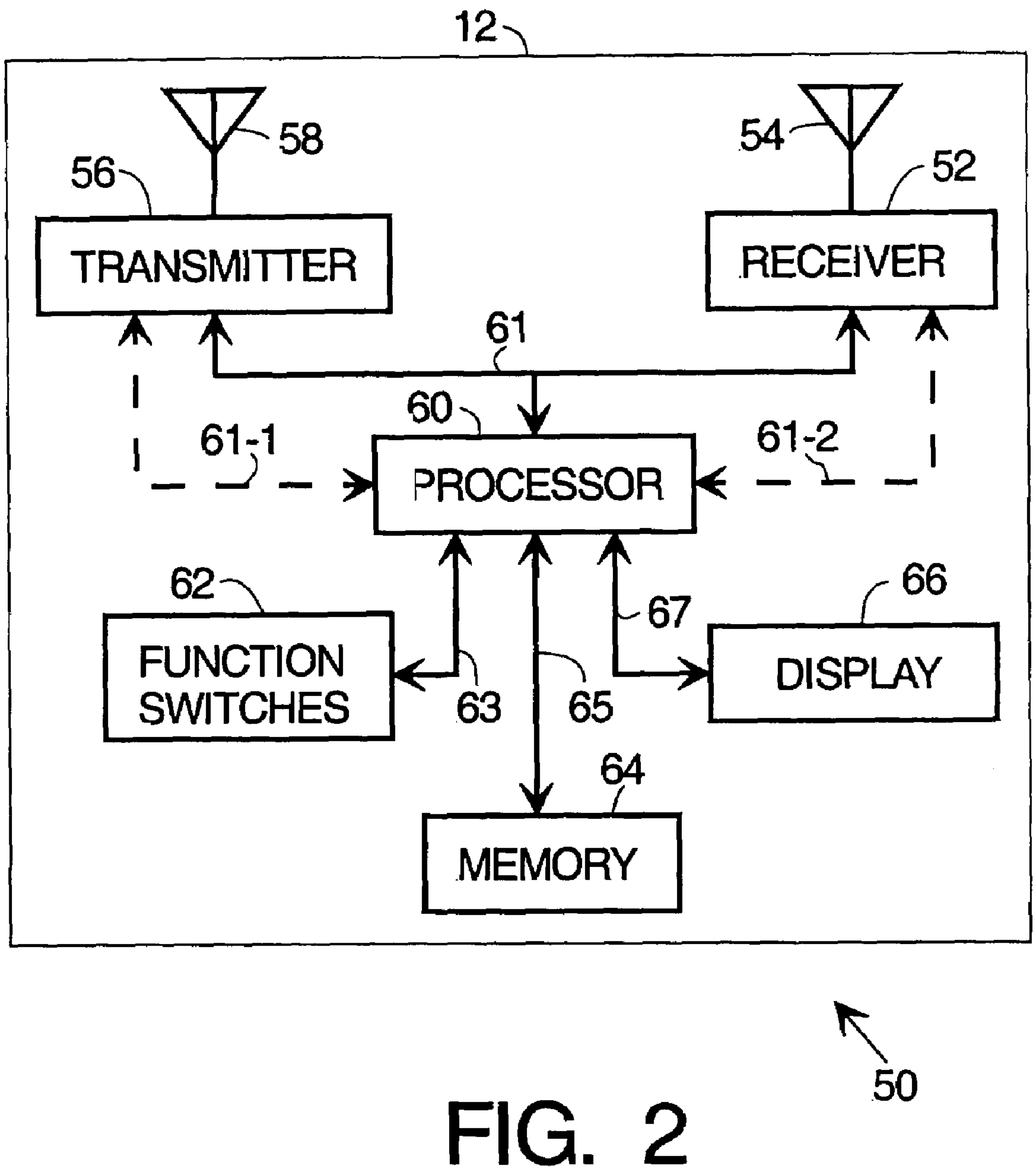
FIG. 2 is a simplified schematic block diagram of the combined remote vehicle keyless entry and garage door control fob of FIG. 1 showing further details.

Combined fob 12 has conventional keyless entry and vehicle control function buttons 24, as for example, but not limited to, vehicle entry "lock" function 24A, "un-lock" function 24B, "panic" signal function 24C, and "trunk" open function 24D. Persons of skill in the art will understand that functions or function buttons 24 are merely exemplary and that more or fewer keyless entry and vehicle control functions may be provided on combined fob 12 and that the particular functions illustrated in FIG. 2 are not intended to be limiting. Keyless entry and vehicle control functions 24 are well known in the art and the exchange of signals 21 between combined fob 12 and vehicle electronics 20 to carry out the functions illustrated by function controls 24 are conventional. Any suitable arrangement may be used. As used herein, the words "button(s)" or "switch(es)" in connection with fob 12 are intended to include any means of entering commands into fob 12 to execute a desired function or combination of functions. Non-limiting examples are: mechanical switches, electronic switches, 'touch' switches, optical switches, magnetic switches, keyboards, and so forth.

Combined fob further 12 comprises universal garage door opener (UGDO) function button or activation switch 26, optional learn mode switch 30 and display or indicator 28. Once learning is complete, switch 26 functionally replaces switch 11 of GD remote control device 14, that is, it accomplishes the same function when depressed as does button or switch 11. When switch 26 is activated it causes combined fob to transmit signal 17 to garage door opener receiver 16. Signal 17 is a replica of signal 15, that is, it is substantially equivalent to signal 15 transmitted by GD remote control 14 when switch 11 thereon is activated. Optional learning switch 30 is convenient but not essential. Its function is to put combined remote 12 into a learning mode wherein the signal parameters of GD remote control 14 can be captured, as will be subsequently explained in more detail. Switch 30 is conveniently of the type that is not easily activated by accident, for example, of the type that can only be conveniently depressed by a stylus or ball point pen or pencil point or the like. This avoids it being unintentionally depressed during normal use of combined fob 12. However, learning switch 30 is not essential. Combined fob 12 may be placed into the GD function learning mode by, for example, continuously depressing switch 26 for a predetermined length of time, e.g., more than 5 seconds or such other time as does not usually occur during normal function use. A still further alternative is to require that two (or more) function switches be simultaneously depressed in order to place combined fob 12 into the GD function learning mode. Persons of skill in the art will understand that these are merely illustrative ways of placing combined fob 12 into the GD function learning mode and that any means of doing so that does not conflict with normal operation may also be used.

Display or indicator 28 may be any convenient means of drawing to the user's attention the state of fob 12 during learning and/or normal operation. One or more light emitting diodes (LEDs), e.g., of different color, shape, arrangement or brightness or a combination thereof, are convenient for indicator or display 28, but this is not essential and not intended to be limiting. Display or indicator 28 maybe visible, audible or tactile or a combination thereof. As used herein the terms "LED", "display" and "indicator" are intended to include any and all of the examples noted above and/or combinations thereof and other alerting means and not be limited merely to light emitting devices or visually viewed devices. As is explained in more detail later, when combined fob 12 enters the learning mode wherein the GD activate signal parameters are about to be or are being detected and memorized by fob 12, indicator or display 28 may flash or change color or otherwise announce or indicate the change in status of combined fob 12. As each step of the learning process occurs (e.g., detect signals, analyze GD activate signals, store essential signal parameters in memory, etc.) display 28 desirably but not essentially provides a different signal or indication to confirm the success or failure of each sub-step (e.g., see FIG. 2). Display 28 may also be used during normal operation of combined fob 12 (i.e., after learning is complete) to indicate that a particular function has been activated and/or that a signal has been sent for a vehicle keyless entry function or GD opener function or whatever. In this respect, having multiple indicators (e.g., LEDs of different size, shape, color and/or location) and/or an alpha-numeric display screen, capable of alerting the user to the fob state for different vehicle keyless entry and GD opener functions is desirable.

FIG. 2 is a simplified schematic block diagram subsystem 50 of combined remote vehicle keyless entry and garage door control fob 12 of FIG. 1 showing further details. For convenience of explanation, sub-system 50 describes and illustrates those elements needed for the GD opener functions of combined fob 12. However, those of skill in the art will understand that the elements of sub-system 50 may also be used for keyless entry functions. Sub-system 50 comprises receiver 52 with antenna 54 adapted to receive signals 13 from GD opener 14 and/or GD actuator 16 (see FIG. 1). Sub-system 50 also comprises transmitter 56 with antenna 58 adapted to send signals 17 to door GD actuator 16. Sub-system 50 also comprises processor 60 coupled to receiver 52 and transmitter 56 by bus 61. While sub-system 50 shows receiver 52 and transmitter 56 coupled to processor 60 by common bus 61, this is merely for convenience of explanation and not intended to be limiting. Persons of skill in the art will understand that receiver 52 and transmitter 56 may be separately coupled to processor 60 as indicated by leads or buses 61-1, 61-2. Either arrangement is useful. Sub-system 50 also comprises function switches 62 coupled to processor 60 by leads or bus 63, memory 64 coupled to processor 60 by leads or bus 65 and display or indicator 66 coupled to processor 60 by leads or bus 67. Function switches 62 correspond to switches 24, 26, 30 of FIG. 1.

When one of function switches 24 of combined fob 12 is actuated by the user, processor 60 retrieves the corresponding instructions for that function from memory 64 and sends the appropriate signaling codes via transmitter 56 and antenna 58 to vehicle electronic system 20 (see FIG. 1). When the user depresses UGDO function switch 26, processor 60 interrogates memory 64 to determine whether the appropriate GD activate signal parameters (e.g., RF frequency and security code) for the GD opener function are present in memory 64. If the appropriate signaling parameters for signal 17 are available in memory 64, processor 60 causes transmitter 56 to modulate the appropriate security and activation codes on the specified RF frequency using transmitter 56 or other transmitter and sends resulting replica 17 of GD activate signal 13 via antenna 58 to garage door activation receiver 16. While only one GD function switch is illustrated on fobs 12, 14 this is merely for convenience of explanation. Multiple switches may also be used for the GD activate function. With only one GD function switch 26, 11 depressing OPEN switch 11 or UGDO switch 26 acts as a toggle, causing garage door 18 to go up if down or down if up. This is conventional. Alternatively, separate UP or DOWN switches may be provided on combined fob 12 provided that garage door actuator receiver 16 is adapted to receive separate UP or DOWN instructions rather than a toggle type signal.

If the appropriate GD activate signaling data is not already present in memory 66, then processor 60 sends a flag or error instruction to display or indicator 66 causing it to indicate that an error has occurred and that system 50 of fob 12 should enter the learn mode. Fob 12 may automatically enter the learn mode under these circumstances or wait until placed in the learn mode by the user. The user can place fob 12 and sub-system 50 in the learn mode by any one of the means previously discussed or any other convenient means. For example, by depressing UGDO button 26 for a predetermined period of time T>T1, or by actuating separate learn switch 30, or any other suitable combination of actions. For purposes of this explanation it is assumed that the appropriate one(s) of function switches 62 have been activated and an "enter learn mode" command signal is sent to processor 60 over leads or bus 63. Processor 60 retrieves the appropriate learn mode instructions from memory 64 and actuates receiver 52 to listen for signal 13 from GD opener 14 or other source of signal 13. In the preferred arrangement, processor 60 also causes display 66 to indicate that sub-system 50 is ready to learn the GD activation frequency and security code. Depending upon the nature of display 66 chosen by the system designer, the LEARN MODE ON indication my consist of one or more LEDs flashing in a particular pattern or color or for an alpha-numeric character display, presentation of the word "LEARN" or "GO" or "TRANSMIT" or "INPUT GDA SIGNAL or equivalent action indicator, where "GDA" is an abbreviation for "garage door activate". The user places GD opener remote 14, for example, in proximity to combined fob 12 and depresses transmit button 11 of GD opener 14 or equivalent to cause it to send signal 13 which is captured by receiver 52 via antenna 54. The RF frequency of signal 13 is noted and the security coding information contained therein is detected and passed on to processor 60. Processor 60 then stores the essential parameters that define signal 13 in memory 64, for example, but not limited to RF transmit frequency and security code format. Once that is done then, as previously explained, combined fob is ready to act as a substitute for GD remote control 14.

Garage door openers transmit on frequencies within one of several assigned bands established by government standards. Therefore, receiver 52 and transmitter 56 should be variable frequency capable, that is, receiver 52 should be able to detect and receive signal 13 within any of the permitted frequency bands and transmitter 56 should be able to transmit on the same frequency in order for fob 12 to be able to generate signal 17 replicating signal 13 of GD remote 14. Software programmable and frequency agile receivers and transmitters and/or controllers are available in microchip form to perform these functions and are in commercial use in other equipment such as sensor excitation devices, digital modulation/demodulation (modems), test and measurement equipment, clock recovery, programmable clock generator, liquid and gas flow measurement, sensory applications, medical equipment, FM chirp source for radar and scanning systems, commercial and amateur RF exciter, wireless and satellite communications, cellular base station hopping synthesizers, broadband communications, tuners, military radar, automotive radar, and wireless microphone receivers in public address systems. Thus, all of the needed functions can be integrated into a low power pocket-sized portable fob.

While sub-system 50 is illustrated as using separate receiver 52 and transmitter 56 this is merely for convenience of explanation and persons of skill in the art will understand that these functions can be combined. Similarly, sub-system 50 is illustrated as using separate receive antenna 54 and transmit antenna 58, but this is merely for convenience of explanation and not intended to be limiting. Persons of skill in the art will understand that a combined transmit-receive antenna may also be used, with an appropriate multiplexer. Such arrangements are well known in the art.

Figure 3:
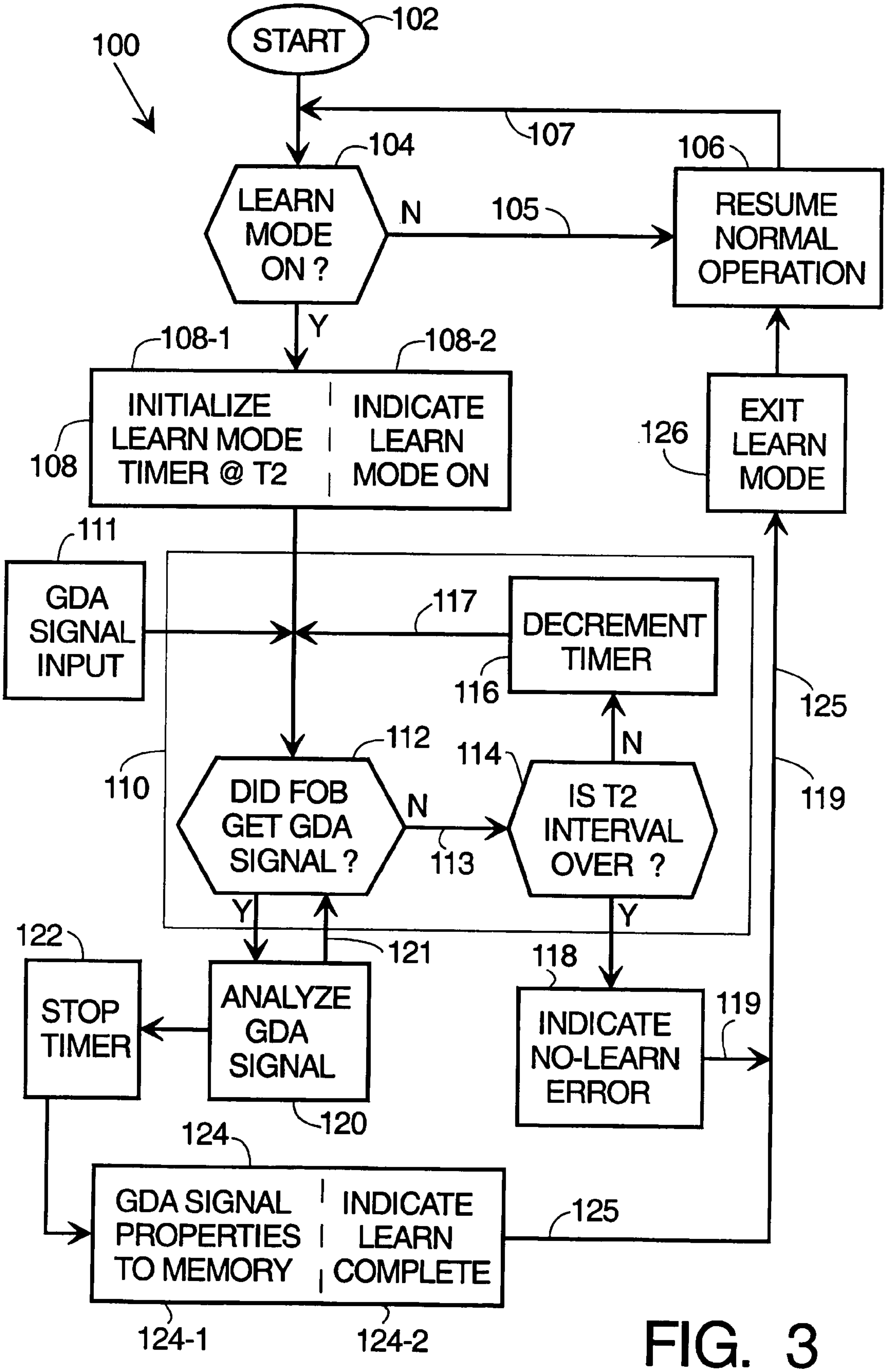
FIG. 3 is a simplified flow chart illustrating the method of the present invention according to a preferred embodiment.

FIG. 3 is a simplified flow chart illustrating method 100 of the present invention according to a preferred embodiment. In FIG. 3, YES (TRUE) is abbreviated as "Y" and NO (FALSE) is abbreviated as "N" with respect to the outcome of various queries. Method 100 begins with start 102 that conveniently occurs on system power-up, e.g., in response to any function button on fob 12 being pushed. Method 100 proceeds to query 104 wherein it is determined whether or not the LEARN MODE has been activated, e.g., by depressing the appropriate one(s) of function switches 62. If the outcome of query 104 is NO (FALSE) then method 100 proceeds as shown by path 105 to RESUME NORMAL OPERATION step 106, whose outcome returns to query 104 as shown by path 107. If the outcome of query 104 is Yes (TRUE) then method 100 proceeds to step 108 comprising INITIALIZE LEARN MODE TIMER @ T2 step 108-1 and INDICATE LEARN MODE ON step 108-2, which steps can be executed in either order. It is assumed for purposes of explanation that the learn mode timer has a timing duration of T2. In step 108-1, processor 60 initializes a timer having predetermined duration T2, as for example but not limited to, by setting a predetermined number into a count-down or count-up counter or other means. Any means of providing a timing function of duration T2 can be used. In step 108-2, processor 60 sends an appropriate command to display 66 to cause it to show or announce that combined fob 12 has entered the learn mode and is ready to receive garage door activate (GDA) training signal 13 from GD remote 14 or equivalent.

Subsequent timing loop 110, comprising steps 112, 114 and 116, causes system 50 to wait up to duration T2 for the user to input a GDA signal (indicated by user executed step 111) in response to the LEARN MODE ON screen prompt generated by step 108-2. In DID FOB GET GDA SIGNAL ? query 112, processor 60 determines whether or not receiver 52 has received the GDA signal. As explained more fully later in connection with feedback path 121 from ANALYZE GDA SIGNAL step 120 back to query 112, some degree of analysis may be performed in connection with step 120 to determine whether a signal received by receiver 52 is likely a proper GDA signal. If the outcome of query 112 is NO (FALSE) then timing loop 110 proceeds to IS T2 INTERVAL OVER ? query 114 wherein it is determined whether or not interval T2 is exhausted. For example, if a count-down timer is being utilized, the timer state can be tested to determine whether or not it has reached zero, but any means of determining whether or not time interval T2 has been exhausted may be used. If the outcome of query 114 is YES (TRUE), meaning that the learning time period has expired, then method 100 proceeds to INDICATE NO-LEARN ERROR step 118 wherein processor 60 directs display 66 to indicate that the learn mode failed, i.e., did not result in comprehending a proper GDA signal. After step 114 and before or after step 118, method 100 proceeds (e.g., by path 119) to EXIT LEARN MODE step 126 and RESUME NORMAL OPERATION step 106 and via path 107 back to START 102 and query 104. For this branch of method 100, step 118 and step 126 may be performed in either order.

If the outcome of IS T2 INTERVAL OVER ? query 114 is NO (FALSE) then timing loop 110 proceeds to DECREMENT TIMER step 116, wherein the remaining portion of interval T2 is decreased by a predetermined amount. For example and not intended to be limiting, a timer comprising a count-down counter could be decremented by some fixed amount (e.g., one or more counts) set by the system designer. As used herein the words “decrement” and “decrement timer” are intended to refer generally to the step of altering a count or time measure either up or down so as to reduce the remaining time interval and not be limited merely to decrement (or increment) type counters. Then, as shown by path 117, timing loop 110 returns to DID FOB GET GDA SIGNAL ? query 112. Timing loop 110 continues until the outcome of query 112 is YES (TRUE) indicating that a GDA signal was received or, as previously discussed, the outcome of query 114 is YES (TRUE) indicating that interval T2 has expired without the fob comprehending a proper GDA signal.

Once the fob has successfully received a GDA signal as indicated by a YES (TRUE) outcome of query 112, then method 100 proceeds to ANALYZE GDA SIGNAL step 120 and STOP T2 TIMER step 122. While it is desirable to do some analysis of the received GDA signal as indicated by feedback path 121 before proceeding this is not essential. Under those circumstances steps 120 and 122 may be executed in either order. Following step 122, step 124 is executed, comprising GDA SIGNAL PROPERTIES TO MEMORY step 124-1 and INDICATE LEARN COMPLETE step 124-2, which may be executed in either order. In step 124-1 the GDA signal properties (as for example but not limited to frequency and security code, etc.) are stored in memory 64 or equivalent. In step 124-2, processor 60 desirably causes display 66 to indicate that the GDA learning mode was successfully completed. Any appropriate message or display (e.g., word message, sound, vibration, light, a combination thereof, etc.) may be used to indicate this. Then, method 100 proceeds, as illustrated for example by path 125 to EXIT LEARN MODE step 126, then via RESUME NORMAL OPERATION step 106 and path 107 back to START 102 and query 104. For this branch of method 100, while the sequence of steps 124 and 126 are preferred, this is not essential and steps 124, 126 may be performed in any order.

For convenience of explanation, analyzing the GDA signal is indicated as occurring in step 120 after query 112 has indicated that the GDA signal has been received. However, the present method comprehends, as indicated by feedback path 121, that some analysis of the GDA signal may be carried out before query 112 indicates successful receipt of the GDA signal. For example, and not intended to be limiting, a signal received by receiver 52 during the interval T2 may be tested in step 120 to determine whether the received frequency and/or format is consistent with that known to be used by GD openers, and/or whether two successive GDA messages are the same, or for rolling codes have an appropriate relationship, and so forth. Persons of skill in the art will understand that none or some or substantial signal verification may be used before deciding in step 112 that the received signal comprehends a proper GDA signal. However, such verification is not essential.

In the embodiments described above, it is preferred that display 66 be included in fob 12, but display 66 is not essential and may be omitted. Similarly, while it is preferred that display steps 108, 118, 124-2 be included in method 100, none are essential and any or all may be omitted. Persons of skill in the art will understand that under circumstances where one or more display step is omitted that the method automatically proceeds to the next step.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A combined fob having vehicle keyless entry functions and garage door (GD) opener functions, comprising:

a receiver adapted to receive a GD activate signal directly from a GD opener;

a processor coupled to the receiver and configured to control the operation of the fob;

a user operated switch coupled to the processor, wherein the switch is adapted to permit the user to input at least 'enter GD learn mode' and 'GD activate' commands for the GD opener function and other commands for the keyless entry functions;

a transmitter coupled to the processor and configured to send vehicle keyless entry signals to a vehicle and GD activate signals to a GD actuation mechanism in response to user operation of the one or more user operated switches;

a memory coupled to the processor, wherein the memory is configured to store signal parameters of the GD activate signal received by the receiver, wherein the parameters are sufficient to allow the transmitter to replicate the GD activate signal under the direction of the processor;

wherein in response to an 'enter GD learn mode' command input via the one or more user operated switches, the processor is configured to start a timer setting a period during which the receiver can receive a GD activate signal from the GD opener, wherein the received GD activate signal is analyzed to extract its signal parameters which are then stored in the memory thereby completing the learn mode; and wherein the GD activate signal parameters are thereafter retrieved by the processor in response to an 'GD activate' command entered by the user into the one or more user operated switches and used to control the transmitter to transmit a replica of the GD activate signal.

2. The fob of claim 1 further comprising a display coupled to the processor, wherein the display acting under the control of the processor is adapted to alert the user when the fob is in the learn mode.

3. The fob of claim 1 wherein the user operated switch is configured to cause the fob to enter the learn mode when activated for at least a predetermined time and to cause the fob to transmit a previously learned GD activate signal when activated for a time period smaller than the predetermined time.

4. The fob of claim 1 wherein the user operated switch is a dual mode switch adapted to cause the fob to enter the learn mode when the dual mode switch is pressed and held for a predetermined time and to cause the fob to transmit a previously learned GD activate signal when the dual mode switch is pressed and substantially immediately released.

5. The fob of claim 1 wherein the user operated switch is adapted to cause the fob to enter the learn mode and a second switch adapted to cause the fob to transmit a previously learned GD activate signal.

6. The fob of claim 1 further comprising a second user operated switch, wherein the user operated switch and second operated switch are configured to cause the fob to enter the learn mode when the switches are activated in combination.

7. The combined fob of claim 1 wherein the processor is configured to transmit an error signal if the timer period expires without receiving the GD activate signal.

8. A method for operating a wireless fob having keyless vehicle entry functions and garage door (GD) activation functions, comprising:

determining whether the fob has entered a GD learn mode, and if NO (FALSE), continuing or resuming normal operation, and if YES (TRUE), then;

maintaining the fob in the GD learn mode up to a predetermined learn mode time interval T2 while waiting for receipt of a GD activate signal directly from a GD opener;

determining whether the fob has received the GD activate signal during learn mode time interval T2, and if NO (FALSE), exiting the learn mode, and if YES (TRUE), then;

analyzing the received GD activate signal to determine parameters characterizing the GD activate signal to permit later replication of the signal by the fob; then storing the parameters characterizing the GD activate signal in memory; and exiting the GD learn mode and resuming normal operation of the fob.

9. The method of claim 8 further comprising after the first determining step, energizing a display adapted to indicate to a user that the fob has entered the learn mode.

10. The method of claim 8 further comprising after the storing or exiting steps, energizing the display to indicate to a user that the fob is no longer in the learn mode.

11. The method of claim 9 wherein after either the second determining step of outcome YES (TRUE) or the storing step, modifying the display to indicate that learn mode was successful.

12. The method of claim 8 wherein the analyzing step is performed at least in part in conjunction with the second determining step to test a received signal for consistency with known GD activate signal formats.

13. The method of claim 8 wherein after the first determining step, prompting the user to activate a nearby GD opener so that the fob can obtain GD activate signal parameters directly from the GD opener.

14. The method of claim 8 wherein the analyzing step is performed at least in part in conjunction with the second determining step to test successive, received signals for consistency with each other.

15. A combined vehicle keyless entry and garage door (GD) opener fob, comprising:

a receiver configured to receive GD activate signals directly from a GD opener during a GD function learn mode of the fob;

a processor coupled to the receiver configured to analyze the GD activate signals received by the receiver directly from the GD opener, to obtain the GD activate signal parameters;

a memory coupled to the processor configured to store the GD activate signal parameters determined by the processor;

a transmitter coupled to the processor configured to transmit in response to a user command a replica of the received GD activate signal based on the parameters stored in the memory; and a user activated function switch configured to place the fob in the GD function learn mode and thereafter to cause the fob to transmit the replica of the GD activate signal.

16. The fob of claim 15 further comprising a display coupled to the processor for indicating when the fob is in the learn mode, for prompting the user to operate the nearby GD opener for learning purposes and for indicating whether learning was successful or not.

17. The fob of claim 16 wherein the display further indicates when the fob has returned to normal, non-learn mode operation.

18. A method of operating a self-contained combined vehicle keyless entry and garage door (GD) opener fob, comprising:

in a learning mode, receiving a GD activate signal directly from a nearby GD opener;

analyzing the received GD activate signal in the fob to determine its parameters so as to permit subsequent replication thereof by the fob;

storing the GD activate signal parameters in memory in the fob thereby completing the learning mode; and thereafter using the stored parameters on user command to cause the fob to transmit a replica of the GD activate signal.

19. The method of claim 18 further comprising prior to the receiving step, prompting the user to activate the nearby GD opener.

20. The method of claim 18 further comprising after the storing step, indicating to the user that the learning mode is complete.

* * * * *